Sept. 18, 1951     H. LINDARS     2,568,345
ELECTRIC SWITCHING APPARATUS Filed April 3, 1946     6 Sheets-Sheet 1

Fig. 1.

INVENTOR:
HERMAN LINDARS,
By Peck + Peck
ATTORNEYS

Sept. 18, 1951        H. LINDARS        2,568,345
ELECTRIC SWITCHING APPARATUS
Filed April 3, 1946                        6 Sheets-Sheet 4

INVENTOR:
HERMAN LINDARS,
By Pech & Pech
ATTORNEYS

Patented Sept. 18, 1951

2,568,345

UNITED STATES PATENT OFFICE 2,568,345

ELECTRIC SWITCHING APPARATUS

Herman Lindars, Sheffield, England

Application April 3, 1946, Serial No. 659,398
In Great Britain September 19, 1945

23 Claims. (Cl. 175—375)

1

This invention relates to electric switching apparatus and more particularly to apparatus, hereinafter referred to as apparatus for "the purpose specified," which will cause a current to flow in an electrical circuit for a time which is a fraction of a single period or a succession of periods of time and which depends upon the value of a fluid pressure.

Such apparatus is required in the control of various operations and processes, and to influence or control other apparatus, such as feed or supply apparatus for gaseous or fluid or solid substances. Such apparatus must be robust and highly sensitive and many types of apparatus have been designed for the purpose.

In the specification of United States Patent No. 2,465,891 to Lindars filed August 10, 1945, apparatus is described in which fluid pressure is employed to control other apparatus through the medium of a pivoted arm or lever on which the fluid pressure exerts a turning moment and means is provided to exert an opposite turning moment which also controls the electric circuit of the said other apparatus. In the specification of the United States Patent No. 2,444,619 to Lindars filed August 30, 1945, apparatus is described which will cause a secondary current to flow for a period which is a definite fraction of the time for which a primary current flows either during a single period or a succession of periods, and comprising an electric eddy current motor of the watt-hour meter type having two current coils or magnets which act on the movable element to urge it in opposite directions, means to cause energization of one magnet when the primary current flows, means to cause energizing of the other magnet at predetermined intervals comprising time mechanism, means to cause de-energization of said other magnet when the movable element of the motor has returned to a zero position, and means to cause a secondary current to flow during the period that the rotatable element of the motor is returning to the zero position, said other magnet causing the movable element to move at a faster rate than does the one magnet.

It is found that a particularly efficient apparatus for the purpose specified is produced by employing a pivoted arm or lever on which the fluid pressure exerts a turning moment and means to exert an opposite turning moment which controls the electric circuit of the other apparatus through the medium of appartus somewhat similar to that described in the specification of United States Patent No. 2,444,619 but having certain essential differences.

2

According to the present invention apparatus for the purpose specified comprises in combination a first pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current coils or magnets, hereinafter called magnets, which act on the movable element to urge it in opposite directions, means to control the current flowing to the one magnet operated by the means to exert an opposite turning moment on the arm or lever, means to cause energization of the other magnet at predetermined intervals comprising time mechanism, means to cause de-energization of said other magnet when the movable element of the motor returns to a zero position, and means to cause a secondary current to flow during the period that the movable element of the motor is returning to the zero position, said other magnet causing the movable element to move at a faster rate than does the one magnet.

The means to provide the opposite turning moment may comprise a weight, means to control the effective point at which the weight acts on the first arm or lever and electrical means to control said effective point.

According to a modification of the invention the weight is positioned to act at a fixed distance from the pivot of the first arm or lever on a second balanced arm or lever which in turn acts on the first arm or lever and the electrical means operates to move said second arm or lever bodily to vary the point of contact of the weight with it and the point of contact of it with the first arm or lever. The length of the second arm or lever from its pivot to its point of contact with the first arm or lever is preferably equal to the distance of the line of action of the weight from the pivot of the first arm or lever.

The weight may be carried by and movable along the first arm or lever and comprise a nut which cooperates with a screw-threaded spindle carried on the arm or lever and driven by the electrical means. Alternatively the weight may be movable along the first arm or lever by cord or chain carried between pulleys or sprockets driven by the electrical means.

The fluid pressure may be applied to the first arm or lever through the medium of a bellows, diaphragm or the like which may be such as to exert a differential pressure or such differential pressure may be produced by a plurality of bellows, diaphragms or the like that may be so disposed that the arm or lever moves in one direction or the other according to the point of application of the higher pressure. In all applications the bellows, diaphragms or the like may be connected to the arm or lever by pivoted links or contact elements may suffice.

The time mechanism used in the means to cause energization of the other magnet of the eddy current motor at predetermined intervals may be any convenient form of time mechanism such as an electric clock and the means to control energization of said other magnet may be a relay which controls contacts in the circuit of said other magnet together with means to cause de-energization of said relay when the movable element of the motor returns to a zero position.

The means to control the current flowing to the one magnet comprises a potentiometer whose variable connection is controlled by the position of the means to exert an opposite turning moment on the arm or lever.

Forms of the invention will now be described by way of example and with reference to the accompanying diagrammatic drawings, wherein.

Figure 5:
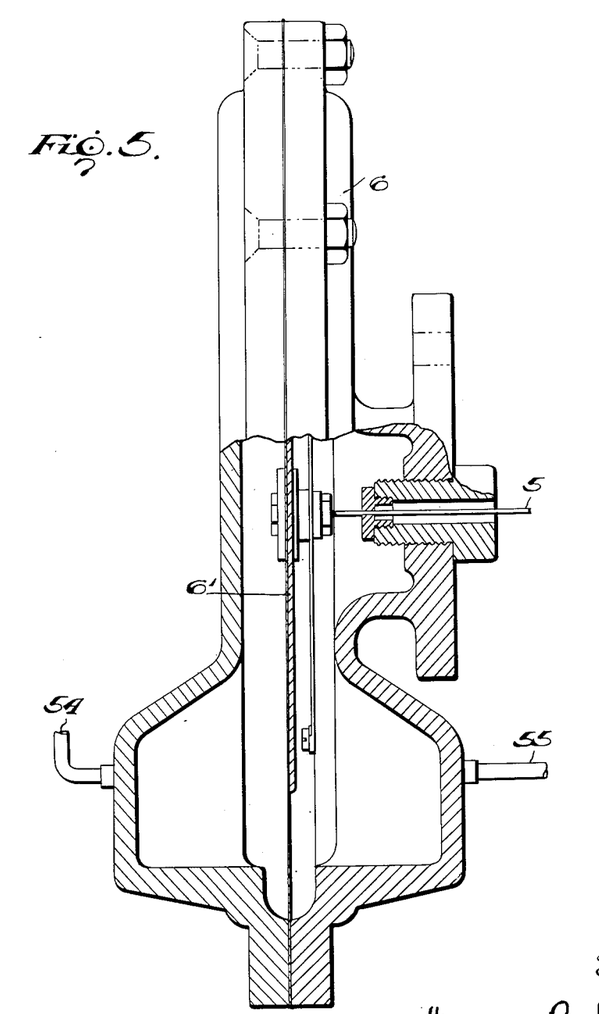
Fig. 5 is a schematic showing of the diaphragm.

Referring to Figs. 1, 1A, 1B and 2 a first or bellcrank lever 1 is mounted to move about a pivot 2 forming its fulcrum and disposed so that the axis of the pivot lies in the plane of the upper surface of the arm 1a of the lever that is normally horizontal. The depending arm 3 of the lever carries a fitting 4 whose end bears against a stem 5 fixed to a diaphragm in an airtight diaphragm chamber 6. Referring to Fig. 5 of the drawings it will be seen that the diaphragm 6' divides the chamber 6 into two parts, which are airtight with respect to each other. The two air pressures, the difference in which operates the apparatus, are applied one to each side of the diaphragm 6' by means of the pipes 54 and 55. Thus the diaphragm will move towards the side of the chamber 6 which contains air at the lower pressure. Such an arrangement is well known. The air supply pressure thus exerts a turning moment on said arm or lever about its pivot. At a suitable position upon the depending lever arm 3 or an extension thereof, advantageously beyond the position of the application of the air pressure, the lever is provided with a contact element 7 bearing contacts 8, 9 adapted, in the movement of the lever in one direction or the other to engage respectively fixed contacts 10, 11 connected to a source of current. The contact element 7 also carries spring fingers 12, 13 bearing respectively contacts 14, 15 disposed between other fixed co-operating contacts 16, 17. When the apparatus is in equilibrium, the contacts 8, 9 and 14, 15 float between the fixed contacts 10, 11 and 16, 17 respectively. The other fixed contacts 16, 17 are respectively connected to relays, to be referred to later, in respective motor control circuits determining the direction of rotation of a reversing motor 18 that is coupled through a belt and pulley reduction gear (generally illustrated at 19 and 20) and a clutch 21 with a horizontally disposed screw-threaded spindle 22 mounted in fixed bearings 23, 24, such that it is supported in juxtaposition and parallel to the horizontal arm 1a of the first lever 1. A nut 25 which co-operates with the screw-threaded spindle 22 and is supported on guide bars 26 so that it is prevented from rotating and is thus constrained to move axially on the spindle serves as a support for the pivot or fulcrum 27 of a second arm or lever 28 that has its free end supported upon the horizontal arm 1a of the lever 1 by a roller 29. This second arm or lever 28 is advantageously provided with a counterweight 30 that may be longitudinally adjustable. The position of the weight is preferably such that the lever is balanced. The proportions and dimensions of the arms or levers are such that in the zero position, i. e. with no fluid pressure or balanced fluid pressure on the diaphragm, the nut 25 is positioned on the spindle 22 to dispose the roller 29 of the second arm or lever 28 over the fulcrum 2 of the first arm or lever 1.

Figure 1:
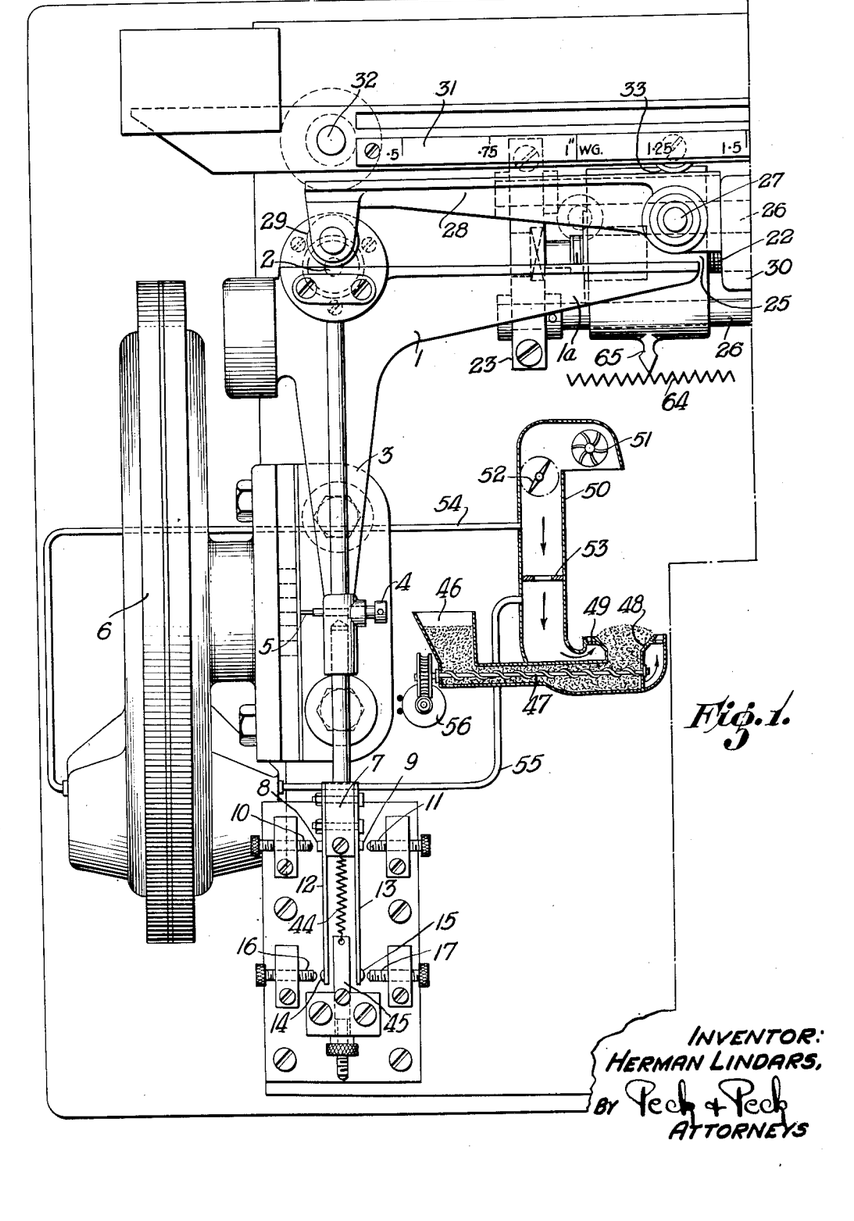
Figs. 1, 1A and 1B together show the application, by way of example, of the invention to a fuel/air ratio controller in apparatus supplying fuel to a furnace.
Figure 1A:
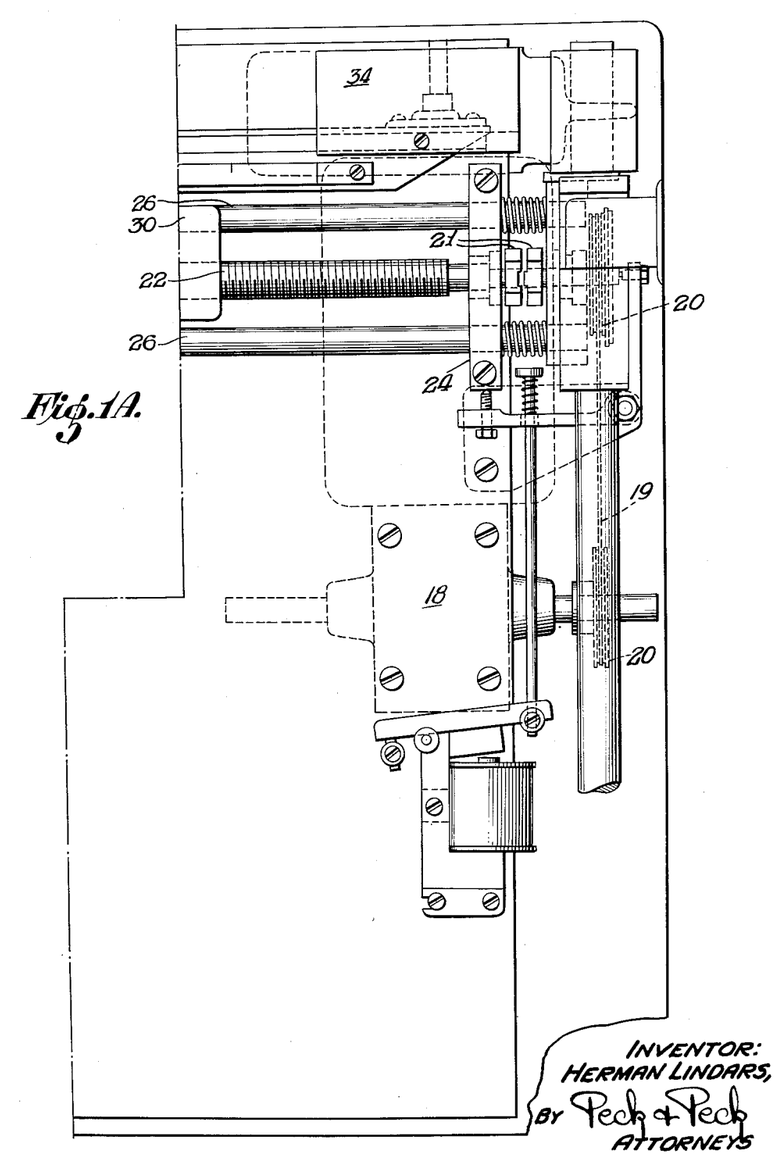
Figure 1B:
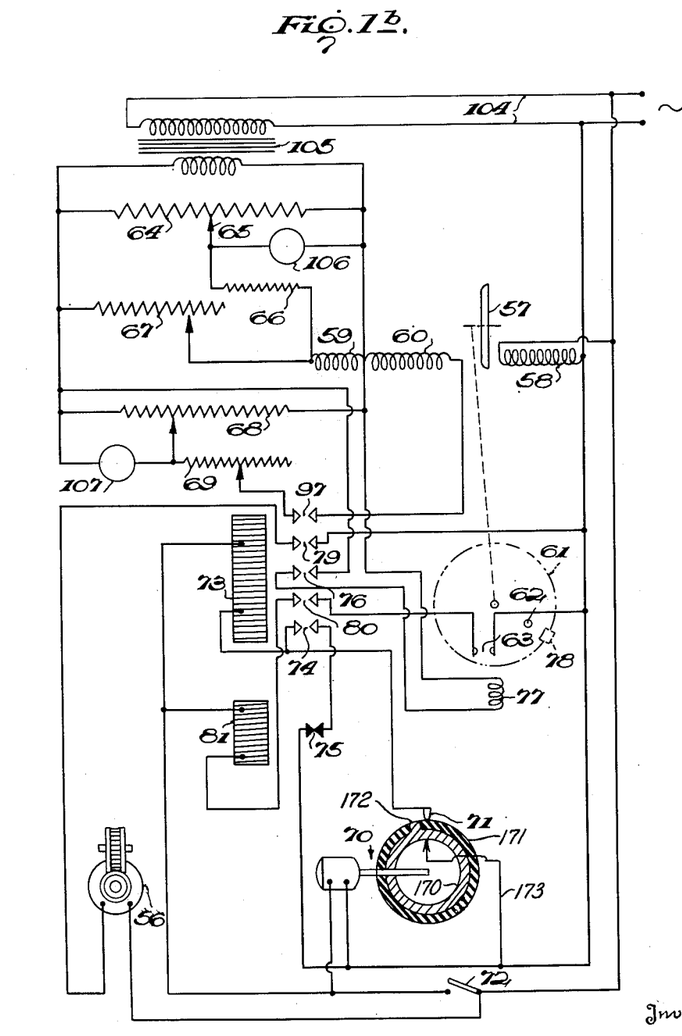

The second arm or lever 28 supports a third arm or lever 31 the fulcrum 32 of which is fixed vertically above the fulcrum 2 of the first arm or lever 1 and that rests upon the second arm or lever 28 by means of a roller 33 disposed over the fulcrum of the arm or lever 28 when the said arm or lever is positioned with its roller 29 over the fulcrum 2 of the lever 1.

The third arm or lever 31 conveniently carries a weight 34 that may be adjustable in position. Thus the length of the second arm or lever 28 from its pivot 27 to its point of contact with the horizontal arm 1a of the first lever 1 is equal to the distance of the line of action of the weight 34 of the third arm or lever 31 from the pivot 2 of the first arm or lever.

Figure 2:
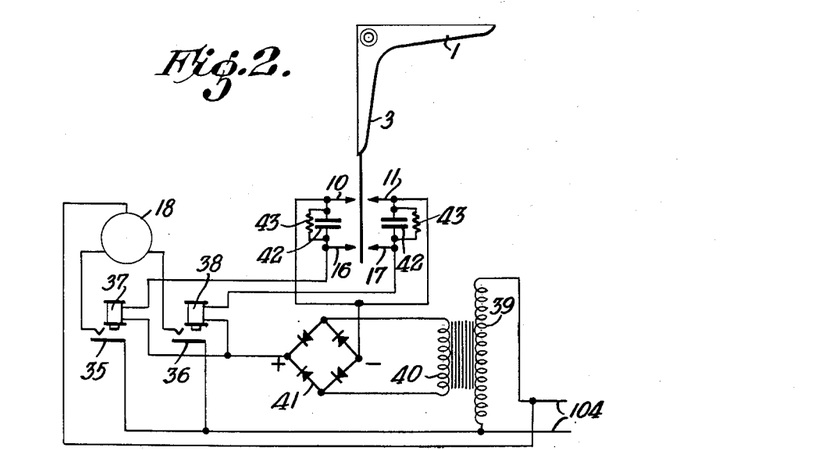
Fig. 2 is a diagram of part of the electrical connections of the apparatus illustrated in Fig. 1 and is to be read in conjunction therewith.

The control and operating circuits for the reversing electric motor 18 are as illustrated in Figure 2 of the drawings which is to be taken as part of Fig. 1 and read in conjunction therewith. The motor 18 is connected across the supply mains 104 with forward and reverse switches 35, 36 that are operated by corresponding relays 37, 38. For the control circuit of the relays current is taken from the mains by way of a transformer 39, the secondary 40 of which is connected across a full wave metal rectifier 41 the positive terminal of which is connected to one of the terminals of each relay, while the negative terminal of the rectifier is connected as the supply to the contacts 10, 11 which are connected to the contacts 16, 17 through corresponding condensers 42 shunted by resistances 43. These are included for the purpose of quenching sparks at the contacts 8, 9, 10, 11, 14, 15, 16 and 17 (Fig. 1). The fixed contacts 16, 17 are respectively connected to the remaining terminals of the relays 37, 38. When the lever arm 3 moves in one direction the contacts 10 and 16 are connected and when it moves in the other direction the contacts 11 and 17 are connected.

The contacts 10, 11, which are advantageously closed after the contacts 16, 17, may serve also as stops to limit the movement of the contact element 7 and thus of the lever arm 3. To ensure against possible oscillation of the lever 1, 3 by vibration a helical spring 44 is connected to the contact element 7 and tensioned by an adjustable member 45.

The furnace with which the apparatus is to be used is illustrated by way of example as a usual underfeed stoker construction in that it embodies a fuel feed hopper 46 with screw-conveyor feed 47 to the retort 48 and provision for the admission of air around the firebox as at 49 from an air supply conduit 50 at the entry end of which is a fan or blower 51 operating at constant speed.

A damper 52 in the conduit controls the flow of air therein. In addition an orifice plate 53 is inserted in the conduit between the fan and the firebox to constitute a constriction of the duct. The flow of air through the conduit 50 produces a pressure difference on opposite sides of the orifice, this difference being proportional to the square of the volume of air passing through it. Pipe connections 54, 55 are led from the duct on either side of the orifice plate to opposite sides of the diaphragm in the diaphragm chamber 6. 56 is an electric motor which d ives the screw conveyor 47.

An electric eddy current motor of the watthour meter type, which is shown diagrammatically, comprises a usual disc 57 of conducting material acted upon by a voltage magnet 58 and two current magnets 59, 60 which urge it in opposite directions.

This disc or rotor 57 has attached to it a small pinion (not shown) which drives disc 61, which is conveniently a large diameter gear wheel with teeth on its periphery. This disc 61 which carries a pin 62 whose movement in one direction will close contacts 63. The forward magnet 59 is supplied constantly with current from a potentiometer 64 (see also Fig. 1) the variable connection 65 to which is carried by the nut 25 and so is controlled by the position or movement of the second lever 28 and consequently by the volume of air flowing through conduit 50. Element 66 is a fixed resistance in series with the forward magnet 59. A variable resistance 67 is connected in parallel with the potentiometer to supply current continuously to the said operating magnet 59. This magnet causes the disc to move so that the pin 62 moves away from the contacts 63.

Energization of the other and reverse magnet 60 causes the disc 61 to move the pin 62 towards the contacts 63 to close them. Said other and reverse magnet 60 is supplied with current through relay contacts 97 from a hand-set potentiometer 68 through an adjustable resistance 69. The current supply to this part of the apparatus is from a transformer 105.

A clock operated switch designated generally at 70 runs continuously when started. The clock is indicated as being driven by a synchronous motor which runs when the main switch 72 is closed. This switch comprises a metal cylinder 170 surrounded by an insulating sleeve 171 through which a metal boss 172 integral with the cylinder 170 projects. The outer surface of the boss 172 forms a continuation of the outer surface of the insulating sleeve 171. The metal cylinder is electrically connected by connection 173 to one side of an electric supply, the other side of which is connected to one terminal of the relay 73. The other terminal of the relay 73 is electrically connected to a brush 71 bearing on the outer surface of the insulating sleeve 171. The switch causes an impulse of current to flow at regular intervals, when the brush 71 contacts the metal boss 172, through the relay 73 to energize it. When this relay is energized it effects a number of operations through a series of contacts. Firstly is closes the contacts 74 and thereby produces a hold-on of the relay 73 after the switch 71 is opened. It will be noted that contacts 74 are in series with contacts 75 which at this stage are closed. Secondly it closes the contacts 97 so as to connect the magnet 60 to the potentiometer 68 through the variable resistance 69. This causes the disc 57 and consequently the disc 61 to rotate in the (reverse) direction so as to move the pin 62 towards the contacts 63. The speed of the disc will be the difference of speed produced by the two magnets 59, 60. Thirdly is closes the contacts 76 so as to connect the magnet 77 to the supply whereby when an armature 78 carried on the disc 61 moves towards said magnet an additional force will be provided to help the rotor 57 to rotate disc 61 in the reverse direction and so move the pin 62 to close the contacts 63. The magnet 77 and armature 78 only exert pressure on disc 61 when the pin 62 is beginning to close contacts 63. Fourthly it operates the contacts 79 which close the secondary circuit in which the secondary current is to flow. In this case the secondary circuit is that of the motor 56 which drives the fuel screw-conveyor 47. Fifthly it closes contacts 80 in the circuit of a second relay 81 and the contacts 63 so that immediately when the pin 62 closes the contacts 63 the relay 81 is energized and the contacts 75 which it controls are opened. As these are in series with the contacts 74 the relay 73 is immediately de-energized and all the contacts which it controls open. Thus current ceases to flow to the secondary circuit. The relay 81 becomes de-energized even though the contacts 63 remain closed. The magnets 59 and 60 are so proportioned and the currents flowing in their respective windings are such that the magnet 60 causes the discs 57 and 61 to rotate faster than does the magnet 59.

Should it be required to raise the temperature of the furnace, the volume of air flow is increased by opening the damper 51, either by some known form of automatic device or manually. Then the pressure of the air below the orifice plate 53 in the air supply conduit 50 will drop. Since this portion of the air supply conduit 50 is connected by the pipe 55 to the right-hand side of the diaphragm chamber 6, the air pressure on the left-hand side of the diaphragm will be greater than that on the right-hand side, and the diaphragm will move to the right, its motion being communicated by the stem 5 to the depending arm 3 of the lever 1, which will also move to the right. This movement will cause two changes to take place in the electrical circuits of the apparatus. Firstly it will connect together the contacts 11 and 17. The motor 18 will then start so as to move the second lever 28 by means of the nut 25 and the roller 29 to a position away from the pivot 2 of the lever 1 to the right as seen in Figure 1. This movement continues until the opposite turning moment exerted by the weight 34 on the lever 31 acting through the roller 33, the second lever 28 and the roller 29 on the horizontal arm 1a of the lever 1 restores the diaphragm in the chamber 6 to the neutral position when the contacts 11 and 17 open and the motor 18 stops. Secondly, the movement of the nut 25 is arranged to shift the variable connection 65 of the potentiometer 64 (Figs. 1 and 1b) in a direction to increase the voltage applied to the current magnet 59. This will have two consequences, the first being that since the current magnet 59 is strongly energized and the current magnet 60 is disconnected, the disc 61 will move rapidly to separate the pin 62 by a considerable distance from the contacts 63, and the second being that, when the current magnet 60 is subsequently energized and the disc 61 moves to bring the pin 62 towards the contacts 63, the disc 61 will move more slowly due to the fact that the strength of the current magnet 59 is more nearly equal to that of the current magnet 60, so that the time which elapses before contacts 63 are closed by pin 62 will be greater.

Since the clock operated switch 70 is running continuously, the switch 71 will transmit a current impulse at regular intervals to the relay 73, energizing it and causing it to close the contacts 74, 76, 79, 80 and 97 which it controls.

The closing of contacts 74 causes the relay 73 to remain energized through the closed contacts 75 after the switch 71 is opened.

The closing of contacts 79 starts the fuel feed motor 56, which will continue to run until relay 73 is de-energized.

The closing of contacts 97 energizes current magnet 60, which will cause the disc 61 to move the pin 62 towards the contacts 63, this movement being slow because the opposing effect of current-magnet 59 has been increased, as previously explained.

The closing of contacts 76 energizes the magnet 77, so that it attracts the armature 78 and holds contacts 63 firmly closed when they are operated by pin 62.

The closing of contacts 80 places the energizing winding of relay 81 in series with the contacts 63 and the supply 104, so that as soon as the pin 62 closes the contacts 63 the relay 81 is energized and contacts 75 are opened. This de-energizes relay 73, the fuel supply motor 56 stops and the whole cycle of operations is repeated as soon as the clock operated switch 71 delivers another current impulse to the relay 73.

The movement of the variable connection 65 of the potentiometer 64 is controlled automatically by the movement of the nut 25, as previously stated. An additional hand adjusted resistance 67 is included in the circuit of the current magent 59, in parallel with the potentiometer. This is to enable a small supply of fuel to be maintained to correspond with the inevitable in-leakage of air to the furnace which occurs even when the air damper 52 is closed.

The volume of air flowing through the conduit 50 is a function of the square root of the differential pressure on opposite sides of the orifice plate 53. The first lever 1 is acted upon directly by the diaphragm in the diaphragm chamber 6 and so is submitted to a pressure which is a function of the differential pressure in the conduit 50 and consequently is a function of the square of the air flow in the pipe line. This lever 1 is engaged by the roller 29 of the second lever which in turn is acted upon by the weighted third lever 31. The action of the third lever on the second lever 28 is on the same side of the fulcrum 27 of this second lever as is the point of contact 29 with the first lever. Since the diposition of the various levers is such that the distance of the fulcrum 2 of the first lever to the point of contact of the roller 29 of the second lever is, in all positions, the same as the distance between the fulcrum 27 of the second lever and the point of contact 33 with it of the weight of the third lever, the effect of the weight of the third lever on the first lever 1 depends upon the square of this distance. Consequently the restoring force exerted on the first lever 1 is a function of the square of the distance through which the second lever is moved to effect such restoration. Consequently the said distance is a function of the square root of the restoring force and thus of the differential pressure acting on the first lever 1 and is thus a direct function of the flow of air in the conduit 50.

The potentiometer is preferably such that a change of fluid pressure will cause a change of current which is proportional to the square root of said change of fluid pressure. If the air flow increases more current is supplied to the magnet 59 and the time that the contacts 79 are closed and the motor 56 is connected to the supply is increased and more fuel is fed to the furnace. Similarly if the air flow decreases less current is supplied to the magnet 59, the motor 56 is connected to the supply for less time and less fuel is fed to the furnace the amount of fuel being regulated in accordance with the air flow.

Element 106 is a voltmeter connected across the variable connection 65 and one end of the potentiometer. Its reading indicates the position of the connection and thus the rate of air flow in the conduit 50. Element 107 is a voltmeter similarly connected to the potentiometer 68 and whose reading is an indication of the fuel/air ratio.

The hand-set potentiometer 68 is adjusted to give the desired fuel/air ratio before the apparatus is started. The variable resistance 67 is adjusted to permit a current to flow continuously to the magnet 59 to allow extra coal to be supplied to the furnace to compensate for inevitable inleakage of air to the furnace.

Figure 3:
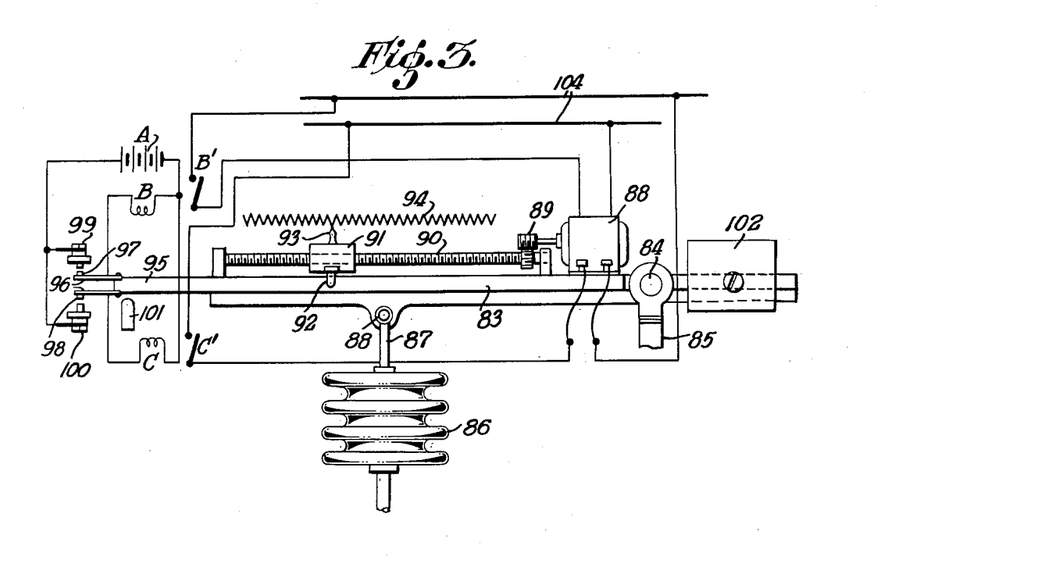
Fig. 3 shows a modified form of the apparatus.

Fig. 3 shows a form of the invention employing one arm or lever only. This arm or lever 83 is pivoted at 84 upon a support 85 and is subjected to the pressure exerted by a fluid by way of an expansible metal bellows 86 that is pivotally coupled by the post 87 to a lug 88 on the lever. On a platform on the lever 83 adjacent the fulcum is mounted a reversing electric motor 88 which through worm gearing 89 is adapted to rotate in either direction a screw-threaded spindle 90 supported in bearings upon the lever and supporting a weight 91 in the form of a nut that is prevented from rotating by guide arms 92 that embrace the sides of the lever. The weight carries the variable connection 93 to the potentiometer 94 which controls the current supplied to the magnet 59 of the eddy current motor described in connection with Fig. 1. The other features of Fig. 1 namely relays, contacts, time switch and connections may be as in Fig. 1 and need not be described. For the control of the motor an extension 95 of the lever carries spring fingers 96 supporting contacts 97, 98 that are adapted to co-operate with fixed contacts 99, 100. A stop 101 may be provided for the support of the lever when it is not subject to pressure. The lever and the several accessories carried by it are balanced by a counterweight 102 mounted upon a short arm of the lever in a position determined as that necessary to ensure that under the normal pressure exerted by the fluid through the bellows 86 the lever floats with the contacts 97, 98 free of the co-operating fixed contacts and with the weight 91 disposed in the zero position that may be immediately above the connection of the bellows 86 to the lever.

The contact 99 is connected to one side of a source of power indicated as a battery A the other side of which is connected through the winding of a relay B to the contact 97. Similarly the contact 100 is connected to one side of the source of power A which at its other side is connected through the relay winding C to the contact 98. The armature B' of the relay B acts to connect the motor 88 in one way to supply mains 104 so that it runs in one direction and the armature C' of the relay C acts to connect it in another way to cause the motor to run in the opposite direction.

On an increase of the pressure of the fluid the bellows 86 expands and applies a turning moment on the first arm or lever 83 to cause the contact 97 to engage the contact 99 thus closing the circuit of the relay B whereby the motor 88 is operated to move the weight 91 along the lever to apply an opposite turning moment. This movement continues until the pressure in the bellows 86 is balanced when the lever returns to the position of balance with the contact 97 separated from the contact 99 thus causing the motor to stop. Should a decrease of the pressure of the fluid occur the lever moves downwards to cause the contact 98 to engage the contact 100 and complete the circuit of the relay C whereby the motor 88 is caused to run in the opposite direction to move the weight towards the fulcrum 84 until balance is restored when the motor is stopped by reason of the separation of the contacts 98 and 100.

The movement of the weight 91 moves the connection 93 over the potentiometer 94 and effects the operations described in connection with Fig. 1. The potentiometer is preferably specially wound to take account of the square root law referred to above.

Figure 4:
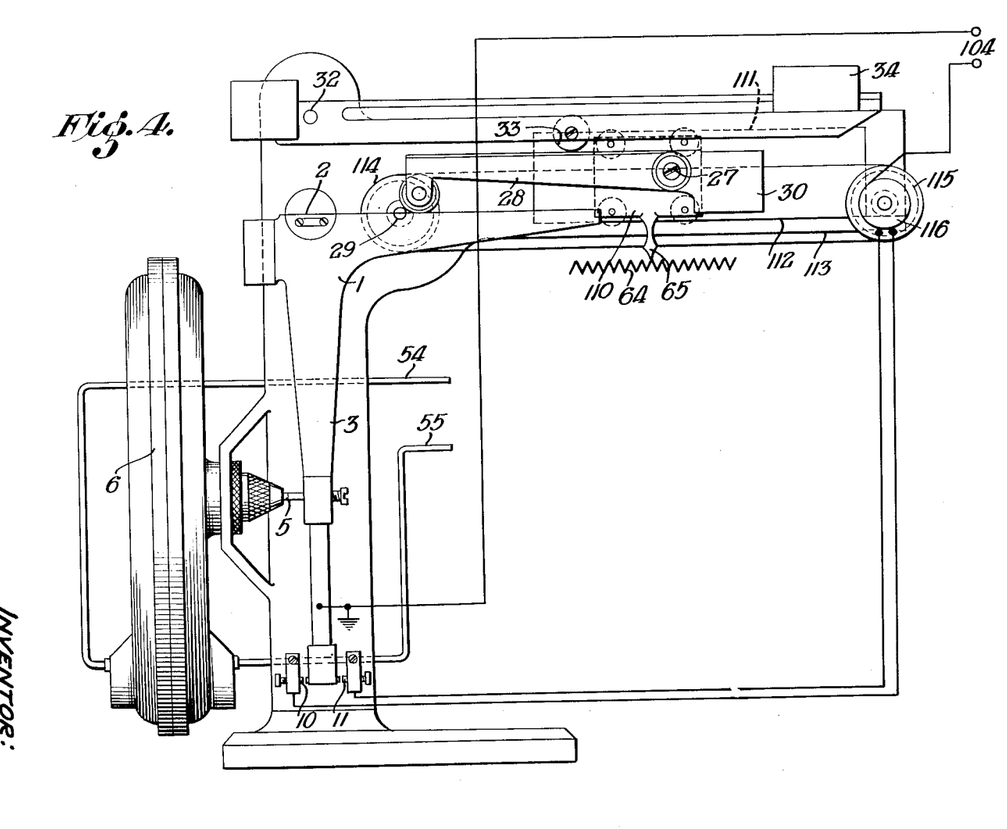
Fig. 4 shows a second modified form of the apparatus.

The modified form of the invention illustrated in Fig. 4 is similar to that of Figs. 1, 1A, 1B and 2 in that it employs three levers and similar references are used for similar parts. The pivot or fulcrum 27 of the second arm or lever 28, however, is mounted on a carriage 110 which runs between horizontally disposed tracks 111, 112. The carriage is connected to a belt 113 passed over pulleys 114, 115 or a chain passed over pulleys 114, 115 (or a chain passed over sprocket wheels) one of which is driven by a reversible electric motor 116. The arrangement of other parts and of contacts and control circuit for the motor 116 may be as described above for the motor 18 of Figs. 1, 1A, 1B and 2 so that the carriage 110 is automatically adjusted to restore the position of the first lever 1 should it be altered by a change in the volume of air flowing to the furnace. It is not thought necessary to repeat the connections and arrangements shown in Figs. 1, 1A, 1B and 2. In some cases, however, the double contact element and the relays of these other figures may be omitted and the motor connected direct to fixed contacts 10 and 11 as illustrated one side of the supply 104 being connected to an extension of the arm 3 of the lever 1.

Though the apparatus has been described as one to effect the control of the feed of solid fuel to a furnace in proportion to the air flow it will be understood that it may be employed to control other apparatus according to a fluid flow.

The apparatus according to the invention has the advantage that the movable element of the bellows or other pressure transmitting device is required to move through an exceedingly small distance from the zero position or position of balance irrespective of the pressure to be transmitted. Thus, errors which may be introduced by a considerable movement of the said element are avoided.

Where it is required to apply the invention to the regulation or control of two variable fluid flows that have to be maintained in constant proportion one to another, the control may be applied by the provision in respect of each variable flow of a bellows, diaphragm or like device, that is operable by differential pressure. It is not essential that the one pressure shall always be greater than the other. Thus, in apparatus such as that of Figure 1, in which a second diaphragm chamber is opposed to the first chamber, it is only necessary, more particularly in the use of a single auxiliary arm or lever, that the lever 1 and the spindle 22 shall be extended sufficiently towards the left to permit the roller 29 to travel to the left of the fulcrum 2.

If the weight on the second arm or lever of the apparatus of Fig. 1 or 4 is adjustable it is possible for the slope of the square root curve representing the rate of flow of the fluid to be modified according to requirements. Thus, in the case where the apparatus is employed for the control of the rate of feed of fuel in accordance with the rate of flow of air through a furnace, when such rate is low, leakage in the fire box and elsewhere would require a departure from the theoretical fuel to air ratio.

Adjustment of the position of the weight on the first of the auxiliary arms or levers permits of such modification of the square root curve that it is possible to determine the admission of more fuel to make up for air in-leakage at the low rates of air flow.

It will be realized that the weight exerted by the third arm or lever in the apparatus of Fig. 1 or 4 may be substituted by a weight supported to act along a fixed line.

What I claim is:

1. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current magnets which act on the movable element to urge it in opposite directions, means to control the current flowing to the one magnet operated by the means to exert an opposite turning moment on the arm or lever, means to cause energization of the other magnet at predetermined intervals comprising time mechanism, means to cause de-energization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

2. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever comprising a weight, means to control the effective point at which the weight acts on the arm or lever, electrical means to control said effective point operated by the movement of the arm or lever to bring it to a position of balance, an eddy current motor of the watt-hour meter type having two current magnets which act on the movable element to urge it in opposite directions, means to control the current flowing to the one magnet operated by the movement of the weight, means to cause energization of the other magnet at predetermined intervals comprising time mechanism, means to cause de-energization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

3. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a second pivoted arm or lever which acts on the first arm or lever, means to exert an opposite turning moment on the first arm or lever comprising a weight which acts on the second arm or lever at a fixed distance from the pivot of the first arm or lever, electrical means operated by the movement of the first arm or lever to move the second arm or lever bodily to vary the point of contact of the weight with it and the point of contact of it with the first arm or lever to bring said first arm or lever to a position of balance, an eddy current motor of the watt-hour meter type having two current magnets which act on the movable element to urge it in opposite directions, means to control the current flowing to the one magnet operated by the movement of the second arm or lever, means to cause energization of the other magnet at predetermined intervals comprising time mechanism, means to cause de-energization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

4. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a second pivoted arm or lever which acts on the first arm or lever, means to exert an opposite turning moment on the first arm or lever comprising a weighted third pivoted arm or lever which acts on the second arm or lever at a fixed distance from the pivot of the first arm or lever, electrical means operated by the movement of the first arm or lever to move the second arm or lever bodily to vary the point of contact of the third arm or lever with it and the point of contact of it with the first arm or lever to bring said first arm or lever to a position of balance, an eddy current motor of the watt-hour meter type having two current magnets which act on the movable element to urge it in opposite directions, means to control the current flowing to the one magnet operated by the movement of the second arm or lever, means to cause energization of the other magnet at predetermined intervals comprising time mechanism, means to cause de-energization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

5. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a second pivoted arm or lever which acts on the first arm or lever, means to exert an opposite turning moment on the first arm or lever comprising a weighted third pivoted arm or lever which acts on the second arm or lever, the length of the second arm or lever from its pivot to its point of contact with the first arm or lever being equal to the distance of the line of action of the third arm or lever from the pivot of the first arm or lever, electrical means operated by the movement of the first arm or lever to move the second arm or lever bodily to vary the point of contact of the third arm or lever with it and the point of contact of it with the first arm or lever to bring said first arm or lever to a position of balance, an eddy current motor of the watt-hour meter type having two current magnets which act on the movable element to urge it in opposite directions, means to control the current flowing to the one magnet operated by the movement of the second arm or lever, means to cause energization of the other magnet at predetermined intervals comprising time mechanism, means to cause deenergization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

6. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a screw-threaded spindle, a nut co-operating therewith, a second arm or lever pivoted on the nut and which acts on the first arm or lever, means to exert an opposite turning moment on the first arm or lever comprising a weight which acts on the second arm or lever at a fixed distance from the pivot of the first arm or lever, electrical means operated by the movement of the first arm or lever to rotate the screw-threaded spindle and move the second arm or lever bodily to vary the point of contact of the third arm or lever with it and the point of contact of it with the first arm or lever to bring said first arm or lever to a position of balance, an eddy current motor of the watt-hour meter type having two current magnets which act on the movable element to urge it in opposite directions, means to control the current flowing to the one magnet operated by the movement of the second arm or lever, means to cause energization of the other magnet at predetermined intervals comprising time mechanism, means to cause de-energization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

7. Electrical switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a screw-threaded spindle, a nut co-operating either with, a second arm or lever pivoted on the nut and which acts on the first arm or lever, means to exert an opposite turning moment on the first arm or lever comprising a weighted third pivoted arm or lever which acts on the second arm or lever at a fixed distance from the pivot of the first arm or lever, electrical means operated by the movement of the first arm or lever to rotate the screw-threaded spindle and move the second arm or lever bodily to vary the point of contact of the third arm or lever with it and the point of contact of it with the first arm or lever to bring said first arm or lever to a position of balance, an eddy current motor of the watt-hour meter type having two current magnets which act on the movable element to urge it in opposite directions, means to control the current flowing to the one magnet operated by the movement of the second arm or lever, means to cause energization of the other magnet at predetermined intervals comprising time mechanism, means to cause de-energization of said other magnet when the movable element of the motor returns to a zero position and means to cause a current to flow in the electrical circuit during the period that the movable element of the motor is returning to the zero position, said other magnet causing the movable element to move at a faster rate than does the one magnet.

8. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a screw-threaded spindle, a nut co-operating therewith, a second arm or lever pivoted on the nut and which acts on the first arm or lever, means to exert an opposite turning moment on the first arm or lever comrising a weighted third pivoted arm or lever which acts on the second arm or lever, the length of the second arm or lever from its pivot to its point of contact with the first arm or lever being equal to the distance of the line of action of the third arm or lever from the pivot of the first arm or lever, a reversing electric motor controlled by the movement of the first arm or lever and operatively connected to the screw-threaded spindle to move the second arm or lever bodily to vary the point of contact of the third arm or lever with it and the point of contact of it with the first arm or lever to bring said first arm or lever to a position of balance, an eddy current motor of the watt-hour meter type having two current magnets which act on the movable element to urge it in opposite directions, means to control the current flowing to the one magnet operated by the movement of the second arm or lever, means to cause energization of the other magnet at predetermined intervals comprising time mechanism, means to cause de-energization of said other magnet when the movable element of the motor returns to a zero position, and means to cause a current to flow in the electrical circuit during the period that the movable element of the eddy current motor is returning to the zero position, said other magnet causing the movable element to move at a faster rate than does the one magnet.

9. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means and contacts in the circuit of the electrical means which are closed by the movement of the arm or lever in one or other direction to control said opposite turning moment to bring said arm or lever to a position of balance operated by the movement of the arm or lever, an eddy current motor of the watt-hour meter type having two current magnets which act on the movable element to urge it in opposite directions, means to control the current flowing to the one magnet operated by the means to exert an opposite turning moment on the arm or lever, means to cause energization of the other magnet at predetermined intervals comprising time mechanism, means to cause de-energization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

10. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a screw-threaded spindle, a nut cooperating therewith, a second arm or lever pivoted on the nut and which acts on the first arm or lever, means to exert an opposite turning moment on the first arm or lever comprising a weighted third pivoted arm or lever which acts on the second arm or lever the length of the second arm or lever from its pivot to its point of contact with the first arm or lever being equal to the distance of the line of action of the third arm or lever from the pivot of the first arm or lever, a reversing electric motor operatively connected to the screw-threaded spindle to move the second arm or lever bodily to vary the point of contact of the third arm or lever with it and the point of contact of it with the first arm or lever, contacts in the circuit of the motor which are closed by the movement of the first arm or lever in one or other direction to cause the motor to run in one or other direction to bring said first arm or lever to a position of balance, an eddy current motor of the watt-hour meter type having two current magnets which act on the movable element to urge it in opposite directions, means to control the current flowing to the one magnet operated by the movement of the second arm or lever, means to cause energization of the other magnet at predetermined intervals comprising time mechanism, means to cause deenergization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

11. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current magnets which act on the movable element to urge it in opposite directions, means to control the current flowing to the one magnet operated by the means to exert an opposite turning moment on the arm or lever, means to cause energization of the other magnet at predetermined intervals comprising a synchronous motor and a switch driven thereby, means to cause de-energization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

12. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current magnets which act on the movable element to urge it in opposite directions, means to control the current flowing to the one magnet operated by the means to exert an opposite turning moment on the arm or lever, means to cause energization of the other magnet at predetermined intervals comprising a relay, contacts in the circuit of said other magnet controlled by the relay, a switch to connect the relay to a supply, means to operate the switch at the predetermined intervals, hold on means for the relay, contacts in the circuit of the hold on means which are closed to release the hold on means when the movable element of the motor returns to a zero position and means to cause a current to flow in the electrical circuit during the period that the movable element of the motor is returning to the zero position comprising contacts controlled by the relay, said other magnet causing the movable element to move at a faster rate than does the one magnet.

13. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current magnets which act on the movable element to urge it in opposite directions, a potentiometer to control the current flowing to the one magnet and whose variable connection is operated by the means to exert an opposite turning moment on the arm or lever, means to cause energization of the other magnet at predetermined intervals comprising time mechanism, means to cause de-energization of said other magnet when the movable element of the motor returns to a zero position, and means to cause a current to flow in the electrical circuit during the period that the movable element of the motor is returning to the zero position, said other magnet causing the movable element to move at a faster rate than does the one magnet.

14. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current magnets which act on the movable element to urge it in opposite directions, a potentiometer to control the current flowing to the one magnet and whose variable connection is operated by the means to exert an opposite turning moment on the arm or lever, means to cause energization of the other magnet at predetermined intervals comprising a relay, contacts in the circuit of said other magnet controlled by the relay, a switch to connect the relay to a supply, means to operate the switch at the predetermined intervals, hold on means for the relay, contacts in the circuit of the hold on means which are closed to release the hold on means when the movable element of the motor returns to a zero position and means to cause a current to flow in the electrical circuit during the period that the movable element of the motor is returning to the zero position comprising contacts controlled by the relay, said other magnet causing the movable element to move at a faster rate than does the one magnet.

15. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current magnets which act on the movable element to urge it in opposite directions, a potentiometer to control the current flowing to the one magnet and whose variable connection is operated by the means to exert an opposite turning moment on the arm or lever, a variable resistance connected in parallel with the potentiometer, means to cause energization of the other magnet at predetermined intervals comprising a relay, contacts in the circuit of said other magnet controlled by the relay, a switch to connect the relay to a supply, means to operate the switch at the predetermined intervals, hold on means for the relay, contacts in the circuit of the hold on means which are closed to release the hold on means when the movable element of the motor returns to a zero position and means to cause a current to flow in the electrical circuit during the period that the movable element of the motor is returning to the zero position comprising contacts controlled by the relay, said other magnet causing the movable element to move at a faster rate than does the one magnet.

16. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current magnets which act on the movable element to urge it in opposite directions, a potentiometer to control the current flowing to the one magnet and whose variable connection is operated by the means to exert an opposite turning moment on the arm or lever, a variable resistance connected in parallel with the potentiometer, means to cause energization of the other magnet at predetermined intervals comprising a potentiometer, a relay, contacts in the circuit of said other magnet controlled by the relay, a switch to connect the relay to a supply, means to operate the switch at the predetermined intervals, hold on means for the relay, contacts in the circuit of the hold on means which are closed to release the hold on means when the movable element of the motor returns to a zero position and means to cause a current to flow in the electrical circuit during the period that the movable element of the motor is returning to the zero position comprising contacts controlled by the relay, said other magnet causing the movable element to move at a faster rate than does the one magnet.

17. Electric switching apparatus which will cause a current to flow in an electrical circuit for a period depending upon the value of a fluid pressure comprising in combination a pivoted arm or lever, means whereby the fluid pressure will exert a turning moment on said arm or lever about its pivot, means to exert an opposite turning moment on said arm or lever, electrical means to control said opposite turning moment to bring said arm or lever to a position of balance operated by the movement of the arm or lever, an eddy current motor of the watt-hour meter type having two current magnets which act on the movable element to urge it in opposite directions, a potentiometer to control the current flowing to the one magnet and whose variable connection is operated by the means to exert an opposite turning moment on the arm or lever, a variable resistance connected in parallel with the potentiometer, means to cause energization of the other magnet at predetermined intervals comprising a potentiometer, a variable resistance in series with said potentiometer, a relay, contacts in the circuit of said other magnet controlled by the relay, a switch to connect the relay to a supply, means to operate the switch at the predetermined intervals, hold on means for the relay, contacts in the circuit of the hold on means which are closed to release the hold on means when the movable element of the motor returns to a zero position and means to cause a current to flow in the electrical circuit during the period that the movable element of the motor is returning to the zero position comprising contacts controlled by the relay, said other magnet causing the movable element to move at a faster rate than does the one magnet.

18. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a second pivoted arm or lever which acts on the first arm or lever, means to exert an opposite turning moment on the first arm or lever comprising a weighted third pivoted arm or lever which acts on the second arm or lever at a fixed distance from the pivot of the first arm or lever, electrical means operated by the movement of the first arm or lever to move the second arm or lever bodily to vary the point of contact of the third arm or lever with it and the point of contact of it with the first arm or lever to bring said first arm or lever to a position of balance, an eddy current motor of the watt-hour meter type having two current magnets which act on the movable element to urge it in opposite directions, a potentiometer to control the current flowing to the one magnet and whose variable connection is operated by the movement of the second arm or lever, means to cause energization of the other magnet at predetermined intervals comprising a relay, contacts in the circuit of said other magnet controlled by the relay, a switch to connect the relay to a supply, means to operate the switch at the predetermined intervals, hold on means for the relay, contacts in the circuit of the hold on means which are closed to release the hold on means when the movable element of the eddy-current motor returns to a zero position and means to cause a current to flow in the electrical circuit during the period that the movable element of the motor is returning to the zero position comprising contacts controlled by the relay, said other magnet causing the movable element to move at a faster rate than does the one magnet.

19. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a second pivoted arm or lever which acts on the first arm or lever, means to exert an opposite turning moment on the first arm or lever comprising a weighted third pivoted arm or lever which acts on the second arm or lever, the length of the second arm or lever from its pivot to its point of contact with the first arm or lever being equal to the distance of the line of action of the third arm or lever from the pivot of the first arm or lever, electrical means operated by the movement of the first arm or lever to move the second arm or lever bodily to vary the point of contact of the third arm or lever with it and the point of contact of it with the first arm or lever to bring said first arm or lever to a position of balance, an eddy current motor of the watt-hour meter type having two current magnets which act on the movable element to urge it in opposite directions, a potentiometer to control the current flowing to the one magnet and whose variable connection is operated by the movement of the second arm or lever, means to cause energization of the other magnet at predetermined intervals comprising a relay, contacts in the circuit of said other magnet controlled by the relay, a switch to connect the relay to a supply, means to operate the switch at the predetermined intervals, hold on means for the relay, contacts in the circuit of the hold on means which are closed to release the hold on means when the movable element of the motor returns to a zero position and means to cause a current to flow in the electrical circuit during the period that the movable element of the motor is returning to the zero position comprising contacts controlled by the relay, said other magnet causing the movable element to move at a faster rate than does the one magnet.

20. Electric switching apparatus which will cause a current to flow in an electrical circuit for a period depending upon the value of a fluid pressure comprising in combination a first pivoted arm or lever, means whereby the fluid pressure will exert a turning moment on said arm or lever about its pivot, a screw-threaded spindle, a nut co-operating therewith, a second arm or lever pivoted on the nut and which acts on the first arm or lever, means to exert an opposite turning moment on the first arm or lever comprising a weighted third pivoted arm or lever which acts on the second arm or lever, the length of the second arm or lever from its pivot to its point of contact with the first arm or lever being equal to the distance of the line of action of the third arm or lever from the pivot of the first arm or lever, a reversing electric motor controlled by the movement of the first arm or lever and operatively connected to the screw-threaded spindle to move the second arm or lever bodily to vary the point of contact of the third arm or lever with it and the point of contact of it with the first arm or lever to bring said first arm or lever to a position of balance, an eddy current motor of the watt-hour meter type having two current magnets which act on the movable element to urge it in opposite directions, a potentiometer to control the current flowing to the one magnet and whose variable connection is operated by the nut, means to cause energization of the other magnet at predetermined intervals comprising a relay, contacts in the circuit of said other magnet controlled by the relay, a switch to connect the relay to a supply, means to operate the switch at the predetermined intervals, hold on means for the relay, contacts in the circuit of the hold on means which are closed to release the hold on means when the movable element of the eddy-current motor returns to a zero position and means to cause a current to flow in the electrical circuit during the period that the movable element of the motor is returning to the zero position comprising contacts controlled by the relay, said other magnet causing the movable element to move at a faster rate than does the one magnet.

21. Apparatus according to claim 2 wherein the weight is carried by and movable along the arm or lever.

22. Apparatus according to claim 3, wherein the pivot of the second arm or lever is mounted on a carriage supported on a track.

23. Apparatus according to claim 4, wherein the pivot of the second arm or lever is mounted on a carriage supported on a track.

HERMAN LINDARS.

REFERENCES CITED

The following references are of record in the file of this patent:

UNITED STATES PATENTS

| Number | Name | Date |
|---|---|---|
| 1,680,026 | McLean | Aug. 7, 1928 |
| 2,490,855 | Burns | Dec. 13, 1949 |